United States Patent
Schaller et al.

(10) Patent No.: US 7,020,393 B2
(45) Date of Patent: Mar. 28, 2006

(54) METHOD OF SYNCHRONIZING PARALLEL OPTICAL LINKS BETWEEN COMMUNICATIONS COMPONENTS

(75) Inventors: William Schaller, Stittsville (CA); Derrick A Nagy, Nepean (CA); Brian Campbell, Ottawa (CA)

(73) Assignee: Alcatel Canada Inc., Kanata (CA)

(*) Notice: Subject to any disclaimer, the term of this patent is extended or adjusted under 35 U.S.C. 154(b) by 822 days.

(21) Appl. No.: 10/012,436

(22) Filed: Dec. 12, 2001

(65) Prior Publication Data
US 2003/0061390 A1 Mar. 27, 2003

(30) Foreign Application Priority Data
Sep. 27, 2001 (CA) .................... 2357932

(51) Int. Cl.
*G02F 1/00* (2006.01)
*H04B 10/08* (2006.01)

(52) U.S. Cl. .............. 398/16; 398/1; 398/9; 398/13; 398/17; 398/25

(58) Field of Classification Search ............ 398/1–9, 398/16, 17, 25, 28, 30, 31, 33, 140, 151, 398/13, 32; 370/276, 278, 282, 503
See application file for complete search history.

(56) References Cited

U.S. PATENT DOCUMENTS
5,629,983 A 5/1997 Fujimoto

| | | | |
|---|---|---|---|
| 5,726,976 A * | 3/1998 | Thompson et al. | 370/229 |
| 5,898,512 A * | 4/1999 | Arai | 398/30 |
| 2004/0028405 A1* | 2/2004 | Unitt et al. | 398/32 |

FOREIGN PATENT DOCUMENTS

| | | |
|---|---|---|
| EP | 0 323 000 | 7/1989 |
| EP | 0 727 892 | 8/1996 |
| WO | WO 97/02687 | 1/1997 |
| WO | WO 00/70827 | 11/2000 |

* cited by examiner

*Primary Examiner*—M. R. Sedighian
(74) *Attorney, Agent, or Firm*—Marks & Clerk; Richard J. Mitchell (57) ABSTRACT

The present invention is directed to a method of synchronizing data transmission through optical links between first and second communications components. Each of the first and second communications components include an optical laser for transmitting and receiving laser signals to and from each other through the optical links. In an embodiment, the method comprises the steps of: (a) initializing each of the first and second communications components; (b) enabling the optical lasers and optical sensors; (c) exchanging idle packets between the first and second communications components to establish a datapath across the optical links; (d) exchanging test data packets across the datapath established in step (c) to verify connection of the optical links; and (e) upon verification of connection of said optical links in step (d), enabling data flow between said first and second communications components. In particular, this method is applicable to synchronizing data transmission across a parallel optical link comprising a plurality of parallel links.

21 Claims, 6 Drawing Sheets

METHOD OF SYNCHRONIZING PARALLEL OPTICAL LINKS BETWEEN COMMUNICATIONS COMPONENTS

FIELD OF THE INVENTION

The invention relates to a method of synchronizing parallel optical links between communications components, such as components of a routing switch platform.

BACKGROUND OF INVENTION

Many switch or router products utilize multiple data interconnection cables or fiber links typically called high-speed inter-shelf links (HISLs). Such HISLs may provide gigabit and terabit bandwidth capacities between various components within a communications device. For example, on a routing switch platform, a HISL may be used to link an interface card or a line card circuit to a switch fabric.

In the interest of link throughput, these HISLs may employ parallel optical interfaces (PAROLI) and may not use framing overhead. Such framing is generally required for link synchronization using conventional methods. Additionally, since PAROLI interfaces comprise a plurality of parallel lines, these lines as well as corresponding circuits and buffers at either end require proper synchronization with respect to each other.

The link synchronization methods presently available either rely on framing, or may not provide satisfactory HISL link alignment of data segments carried on the PAROLI link. Also, known prior art solutions do not prevent cells from being sent through the HISL before it is fully synchronized, resulting in faulty performance.

Thus, there is a need for a method of synchronizing PAROLI links between components of a communications device which is more reliable and robust than methods available in the prior art.

SUMMARY OF INVENTION

In an aspect of the invention, there is provided a method of synchronizing unframed data flow through parallel optical links between first and second communications components, each said first and second communications components including an optical laser for transmitting laser signals to the other through said optical links, and each said first and second communications components including optical sensors for receiving said transmitted laser signals, the method comprising the steps of:
(a) initializing each of said first and second communications components;
(b) enabling said optical lasers and optical sensors and exchanging idle packets between said first and second communications components to establish a datapath across said optical links;
(c) exchanging test data packets across said datapath established in step (b) to verify connection of all of said optical links; and
(d) upon verification of connection of said optical links in step (c), enabling data flow between said first and second communications components;

whereby, said optical links are synchronized, said datapath is established, and said test data transmission is verified before said data flow is allowed between said first and second communications components.

In an embodiment, step (a) of the method comprises:
(i) flushing FIFO performed by a device reset and input queues of said first and second communications components;
(ii) enable said optical lasers and said optical sensors; and
(iii) latching serial-deserializer circuits operatively connected to said optical links.

In another embodiment, step (b) of the method comprises:
(iv) enabling said optical laser in said first communications device and transmitting laser signals comprising idle packets to said second communications device;
(v) enabling said optical sensor in said first communications device;
(vi) enabling said optical sensor in said second communications device;
(vii) detecting idle packets in said second communications device;
(viii) flushing any queues in said second communications device and detecting said idle packets received from said first communications device;
(ix) upon detection of said idle packets from said first communications device in step (vii), enabling said optical laser in said second communications device and transmitting laser signals comprising return idle packets to said first communications device; and
(x) detecting said return idle packets from said second communications device using said optical sensor in said first communications device.

In another embodiment, step (c) of the method comprises:
(xi) generating test data packets in said first communications device and transmitting said test data packets across said datapath to said second communications device;
(xii) receiving and enqueuing said test data packets in said second communications device;
(xiii) testing said dequeued test data packets to verify that they are properly encoded;
(xiv) upon receiving properly encoded test data packets from said first communications device in step (xiii), generating return test data packets and transmitting said return test data packets across said datapath to said first communications device; and
(xv) receiving and enqueuing said return test data packets generated in step (xiii) in said first communications device;
(xvi) testing said dequeued return test data packets to verify that they are properly encoded; and
(xvii) upon receiving properly encoded return test data packets, verifying the connection of said optical links.

In a second aspect, the present invention provides a method of resynchronizing unframed data flow through parallel optical links between first and second communications components upon an occurrence of a communications error therebetween, each said first and second communications components including an optical laser for transmitting laser signals to the other through said optical links, and each said first and second communications components including optical sensors for receiving said transmitted laser signals, the method comprising the steps of:
(a) detecting a communications error;
(b) upon detection of said communications error in step (a) initializing each of said first and second communications components;
(c) enabling said optical lasers and optical sensors and exchanging idle packets between said first and second communications components to establish a datapath across said optical links;

(d) exchanging test data packets across said datapath established in step (c) to verify connection of all of said optical links; and
(e) upon verification of connection of said optical links in step (d), enabling data flow between said first and second communications components;

whereby, said optical links are synchronized, said datapath is established, and said test data transmission is verified before said data flow is allowed between said first and second communications components.

In an embodiment, step (b) of the second aspect comprises:
(i) flushing FIFO performed by a device reset and input queues of said first and second communications components;
(ii) enabling said optical lasers and said optical sensors; and
(iii) latching serial-deserializer circuits operatively connected to said optical links.

In another embodiment, step (c) of the second aspect comprises:
(iv) enabling said optical laser in said first communications device and transmitting laser signals comprising idle packets to said second communications device;
(v) enabling said optical sensor in said first communications device;
(vi) enabling said optical sensor in-said second communications device;
(vii) flushing any queues in said second communications device and detecting said idle packets received from said first communications device;
(viii) upon detection of said idle packets from said first communications device in step (vii), enabling said optical laser in said second communications device and transmitting laser signals comprising return idle packets to said first communications device; and
(ix) detecting said return idle packets from said second communications device using said optical sensor in said first communications device.

In another embodiment, step (d) of the second aspect comprises:
(x) generating test data packets in said first communications device and transmitting said test data packets across said datapath to said second communications device;
(xi) receiving and enqueuing said test data packets in said second communications device;
(xii) testing said dequeued test data packets to verify that they are properly encoded;
(xiii) upon receiving properly encoded test data packets from said first communications device in step (xii), generating return test data packets and transmitting said return test data packets across said datapath to said first communications device; and
(xiv) receiving and enqueuing said return test data packets generated in step (xiii) in said first communications device;
(xv) testing said dequeued return test data packets to verify that they are properly encoded; and
(xvi) upon receiving properly encoded return test data packets, verifying the connection of said optical links.

In a third aspect, the present invention provides a method of synchronizing data flow through parallel optical links between a fabric interface card and a switch access card, each said fabric interface card and said switch access card including an optical laser for transmitting laser signals to the other through said optical links, and each said fabric interface card and said switch access card including optical sensors for receiving said transmitted laser signals, the method comprising the steps of:
(a) initializing each of said fabric interface card and said switch access card;
(b) enabling said optical lasers and optical sensors and exchanging idle packets between said fabric interface card and said switch access card to establish a datapath across said optical links;
(c) exchanging test data packets across said datapath established in step (b) to verify connection of all of said optical links; and
(d) upon verification of connection of said optical links in step (c), enabling data flow between said fabric interface card and said switch access card;

whereby, said optical links are synchronized, a datapath is established, and test data transmission is verified before data flow is allowed between said fabric interface card and said switch access card.

In an embodiment, step (a) of the third aspect comprises:
(i) flushing FIFO performed by a device reset and input queues;
(ii) enabling said optical lasers and said optical sensors; and
(iii) latching serial-deserializer circuits operatively connected to said optical links In another embodiment, step (b) of the third aspect comprises:
(iv) enabling said optical laser in said fabric interface card and transmitting laser signals comprising idle packets to said switch access card;
(v) enabling said optical sensor in said fabric interface card;
(vi) enabling said optical sensor in said switch access card;
(vii) flushing any queues in said switch access card and detecting said idle packets received from said fabric interface card;
(viii) upon detection of said idle packets from said fabric interface card in step (vii), enabling said optical laser in said switch access card and transmitting laser signals comprising return idle packets to said fabric interface card; and
(ix) detecting said return idle packets from said switch access card using said optical sensor in said fabric interface card.

In another embodiment, step (c) of the third aspect comprises:
(x) generating test data packets in said fabric interface card and transmitting said test data packets across said datapath to said switch access card;
(xi) receiving and enqueuing said test data packets in said switch access card;
(xii) testing said dequeued test data packets to verify that they are properly encoded;
(xiii) upon receiving properly encoded test data packets from said fabric interface card in step
(xii), generating return test data packets and transmitting said return test data packets across said datapath to said fabric interface card; and
(xiv) receiving and enqueuing said return test data packets generated in step (xiii) in said fabric interface card;
(xv) testing said dequeued return test data packets to verify that they are properly encoded; and
(xvi) upon receiving properly encoded return test data packets, verifying the connection of said optical links.

In a fourth aspect, the present invention provides a method of resynchronizing data flow through parallel optical links between a fabric interface card and a switch access card upon an occurrence of a communications error therebetween, each said fabric interface card and said switch access card including an optical laser for transmitting laser signals to the other through said optical links, and each said fabric interface card and said switch access card including optical sensors for receiving said transmitted laser signals, the method comprising the steps of:

(a) detecting a communications error;
(b) upon detection of a communications error in step (a) initializing each of said fabric interface card and said switch access card;
(c) enabling said optical lasers and optical sensors and exchanging idle packets between said fabric interface card and said switch access card to establish a datapath across said optical links;
(d) exchanging test data packets across said datapath established in step (c) to verify connection of all of said optical links; and
(e) upon verification of connection of said optical links in step (d), enabling data flow between said fabric interface card and said switch access card;

whereby, said optical links are synchronized, said datapath is established, and said test data transmission is verified before said data flow is allowed between said fabric interface card and said switch access card.

In a fifth aspect, the present invention provides a method of synchronizing unframed data flow through a communications link between first and second communications components, each said first and second communications components including a transmitter for transmitting signals to the other through said communications link, and each said first and second communications includes a receiver for receiving said transmitted signals, the method comprising the steps of:

(a) initializing each of said first and second communications components;
(b) enabling said transmitters and said receivers and exchanging idle packets between said first and second communications components to establish a connection across said communications link;
(c) exchanging test data packets across said datapath established in step (b) to verify connection of said communications links; and
(d) upon verification of connection of said communications link in step (c), enabling data flow between said first and second communications components.

In an embodiment of the fifth aspect, said communications link is a parallel optical link, said transmitter is an optical laser, and said receiver is an optical sensor.

In another embodiment of the fifth aspect, the method further comprises the step of completing synchronization of said optical links, establishing said datapath, and verifying said test data transmission before data flow is allowed between said first and second communications components.

In other aspects, the present invention provides various combinations of the above aspects.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF THE EMBODIMENTS

The description, which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

The terms as used in this description have the definitions as set out in Table A, below.

TABLE A

| Term | Definition |
| --- | --- |
| ASIC | Application Specific Integrated Circuit |
| ATM | Asynchronous Transfer Mode |
| FIC | Fabric Interface Card |
| HISL | High Speed Inter Shelf Link |
| HSC | High Speed Shelf Controller |
| HSPS | High Speed Peripheral Shelf |
| ICON | Inter Shelf Connection |
| IP | Internet Protocol |
| LCS Protocol (PMC Trademark) | The LCS (LineCard to Switch) protocol is a proprietary communications protocol developed by PMC Sierra which runs on an HISL |
| LPC | Line Processing Card |
| PAROLI | Parallel Optical Link/Parallel Optical Interface |
| PS | Peripheral Shelf |
| Rx | Receive |
| SAC | Switch Access Card |
| SCH | Switching Scheduler Card |
| SS | Switching Shelf |
| SMX | Switch Matrix |
| SSC | Switching Shelf Controller |
| Tx | Transmit |
| Link | Is a pair of HISL cabled connections between a SAC and FIC. Each cable is a twelve stranded fiber cable. |
| Fiber | A single strand of twelve that makes up a HISL cable. |

The following is a description of a network associated with a routing switch platform on which a method in accordance with an embodiment of the invention may be practiced.

Figure 1:
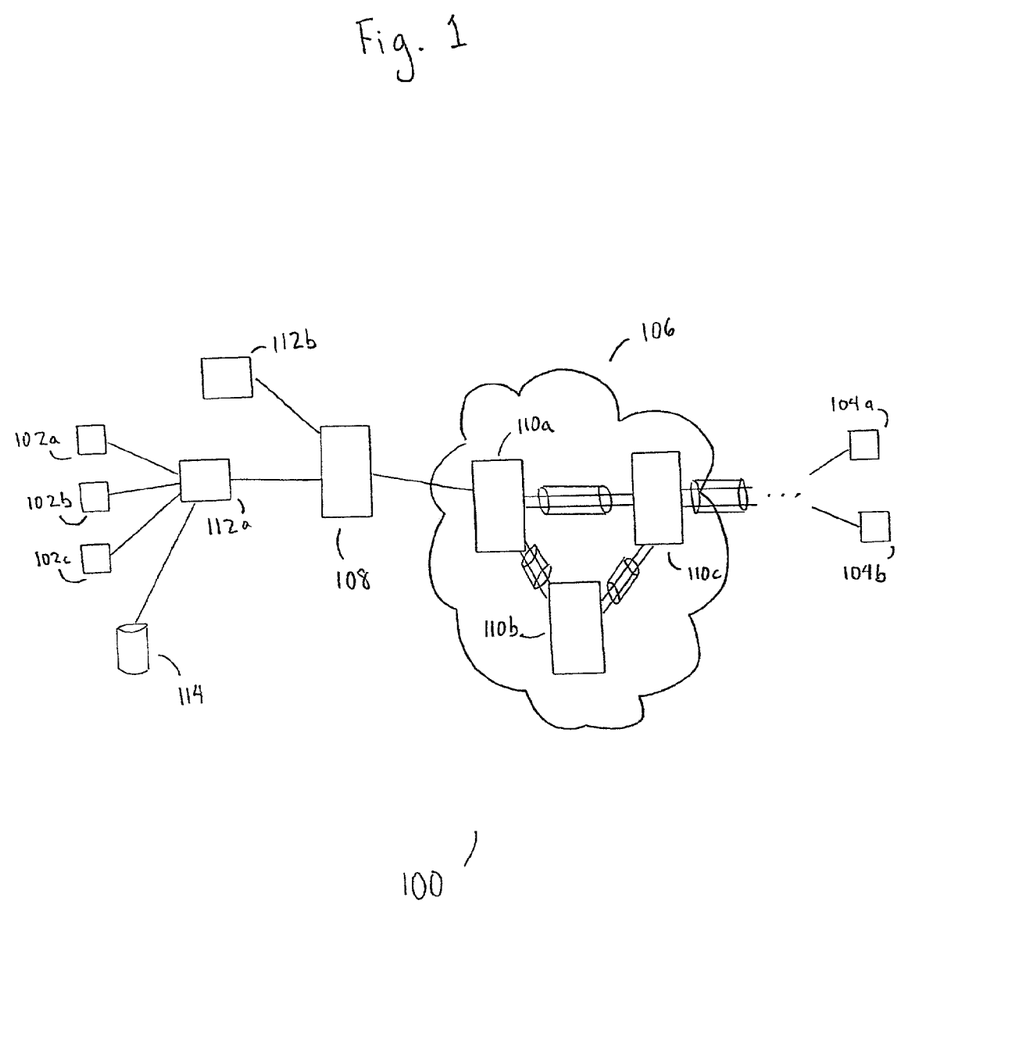
FIG. 1 is a block diagram of a communications network including a routing switch platform in which a link synchronization method in accordance with an embodiment may be used.

Referring to FIG. 1, a communication network 100 is shown. Network 100 allows devices 102A, 102B, and 102C to communicate with devices 104A and 104B through network cloud 106. At the edge of network cloud 106, routing switch 108 is the connection point for devices 102A, 102B and 102C to network cloud 106. In network cloud 106, a plurality of switches 11A, 110B and 110C are connected forming the communications backbone of network cloud 106. In turn, connections from network cloud 106 to devices 104A and 104B.

It will be appreciated that terms such as "routing switch", "communication switch", "communication device", "switch" and other terms known in the art may be used to describe switch 108. Furthermore, while the embodiment is described for switch 108, it will be appreciated that the system and method described herein may be adapted to any switching system including switches 110A, 110B and 110C.

Switch 108 may be a multi-protocol backbone system which can process, for example, both ATM cells and IP traffic through its same switching fabric. Routing switch 108 may allow scaling of the switching fabric capacity, for example, from 50 Gbps to 450 Gbps in increments of 14.4 Gbps simply by the insertion of additional shelves into the multi-shelf switch system. To enable the exchange of data and status information at such switching fabric capacities, corresponding high-speed links are required between various communications components of the switch 108.

Figure 2:
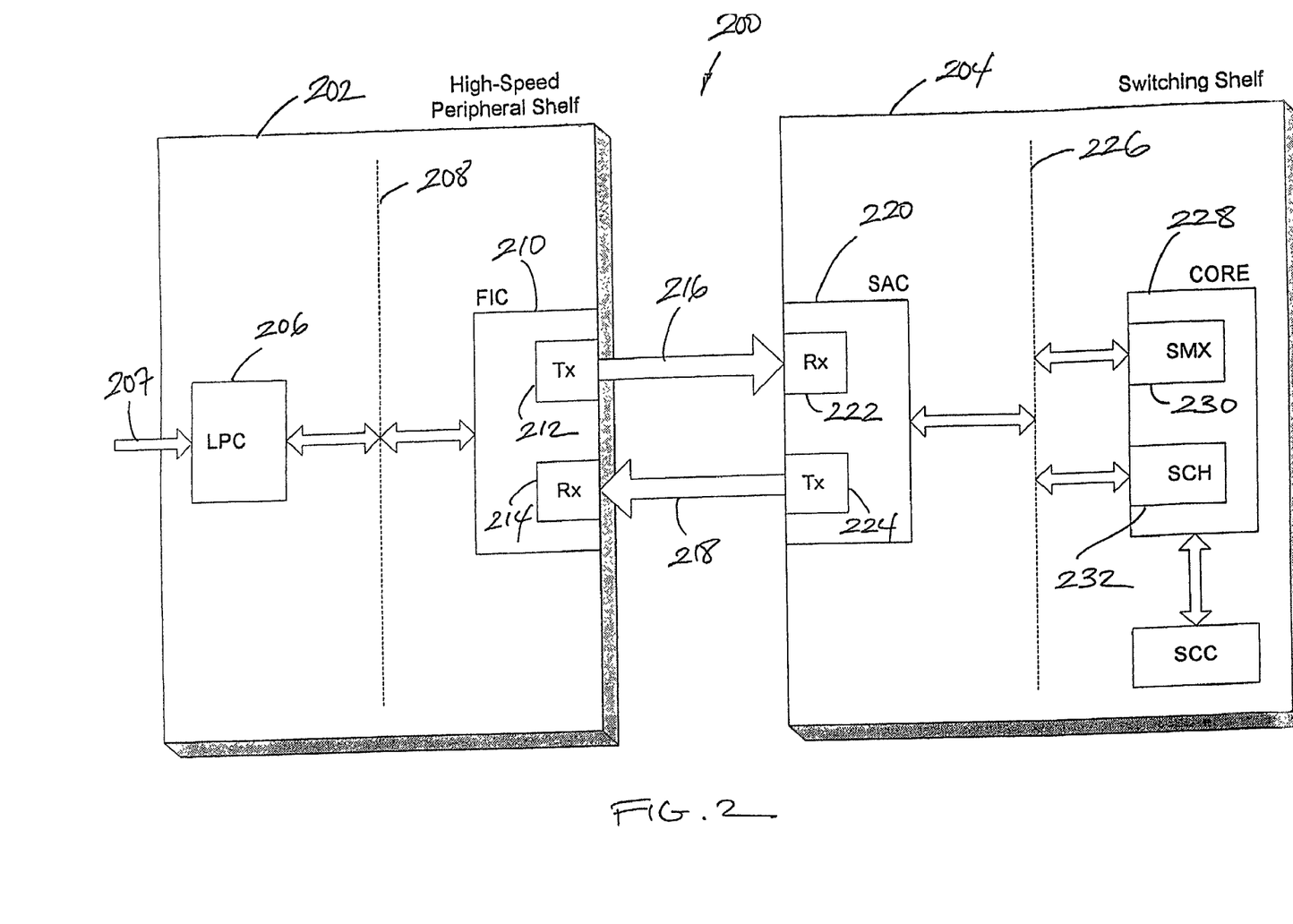
FIG. 2 is a block diagram showing high-speed inter-shelf connections between various communications components within the routing switch platform of FIG. 1.

Referring to FIG. 2, the switch 108 may include a switching fabric 200 comprising a peripheral shelf (PS) 202 and a switching shelf (SS) 204. In operation, the switching fabric 200 receives data traffic from devices connected to an ingress port of switch 108 (e.g. 112a of FIG. 1), processes the data traffic through its fabric, then forwards the data traffic to the correct egress port of switch 108.

As shown in FIG. 2, each PS 202 may include a line processing card (LPC) 206 which receives the data traffic from the ingress port 207 of switch 108. The LPC 206 communicates via a mid-plane 208 to a fabric interface card (FIC) 210. The FIC 210 includes a transmit (Tx) optical device 212 and a receive (Rx) optical device 214, which are connected to HISL 216 and HISL 218, respectively. HISLs 216, 218 link the FIC 210 to a switch access card (SAC) 220 in SS 204. More specifically, HISL 216 links Tx optical device 212 to a corresponding Rx optical device 222 in the SAC 220 which represents the ingress direction of packet flow into the switching core. Similarly, HISL 218 links Rx optical device 214 to a corresponding Tx optical device 224 in the SAC 220 which represents the egress direction of packet flow out of the switching core. The SAC 220 in turn communicates via a mid-plane 226 to a switching core 228. Within each core 228, there may be up to six switching matrix cards (SMX) 230. Each SMX card 230 may provide a selectable output stream for data traffic received through its input stream. A set of six SMX cards 230 may constitute a non-blocking 32×32 HISL core of the switching fabric 200. Cell switching both to and from the SAC 220 may be present and configured in order to provide an operational switching core 228 for the switching shelf 204. Each switching shelf 204 may contain a switching fabric core 228 and up to 32 SACs 220, each of which may provide, for example, 14.4 Gbps of cell throughput to and from the core 228.

Still referring to FIG. 2, the HISLs 216, 218 may each provide, for example, 14.4 Gbps bandwidth. Each HISL 216, 218 may comprise twelve PAROLIs having a capacity of 1.5 Gbps each. In this case, each HISL 216, 218 would have twelve strands of optical fiber and the SAC 220 would have twelve dataslices (FIG. 3, below) to handle the queuing of cells into the switching core 228. In an embodiment, each cell is segmented amongst the twelve links. For example, 6 bytes (48 bits) are transmitted on each fiber for a total of 72 bytes sent in parallel every 40 ns. However, it will be appreciated that the HISL 216, 218 may comprise other than twelve PAROLIs and have different throughput capacities or segmentation of cells.

Figure 3A:
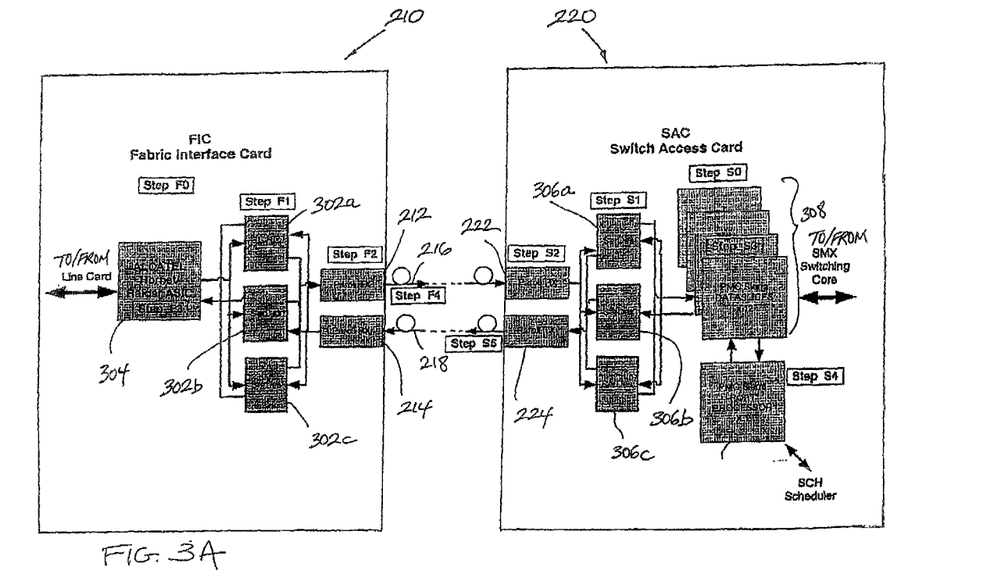
FIG. 3A is a block diagram of link synchronization aspects of the components of FIG. 2.

Now referring to FIG. 3A, a block diagram shows further details of the link synchronization components in the FIC 210 and SAC 220. Also shown in FIG. 3A are the relative points of execution of various steps in a synchronization method for both the egress and ingress directions: The FIC process steps are numbered as F0, F1, F2, etc. and the SAC process steps are numbered as S0, S1, S2, etc. These steps provide coordinated synchronization of the HISL. Accordingly, these FIC process steps and SAC process steps may be independent of each other and need not know the state of the other end of the HISL 216, 218. Rather, each process may rely on sensing the current state of their respective devices and circuits to determine whether to move onto the next step. A link synchronization method including these various FIC process steps and SAC process steps is described in detail below, with reference to FIG. 4 and FIG. 5.

In operation, the FIC 210 may provide encoding/decoding of data, supervise queue management of cells to/from the line card/switch fabric, manage backpressure to/from the line card, and handle protocol across the HISLs 216, 218 through a specific device.

The data flow from the FIC 210 to the SAC 220 is as follows. In the FIC 210, the input data stream from a line processing card 206 is received by an application specific integrated circuit (ASIC) 304 which provides encoding/decoding of data, LCS protocol management, cell queue management, CRC detection and generation as well as parity checks. For example, the ASIC 304 may provide eight bit-to ten-bit (8B/10B) encoding/decoding. 8B/10B encoding will take an eight-bit cell and map it to a ten-bit cell to disallow continuous zero or one bit streams. This is necessary due to the optical devices which require periodic transitions to properly detect ones and zeros. As a non-limiting example, a suitable ASIC is Part No. 34-3626-00 manufactured by Alcatel Canada Inc.

The ASIC 304 is connected to a plurality of serial-deserializers (Ser/Des) 302a, 302b, 302c which collectively perform a serialization of the data stream arriving as an input from ASIC 304. The Ser/Des 302a–302c are connected to a PAROLI Tx optical device 212. In operation, the Tx optical device 212 transmits the serialized data stream through the HISL 216 (comprising a PAROLI with twelve optical fibers operating at 1.5 Gbps, for example) to Rx optical device 222 in the SAC 220.

Figure 3B:
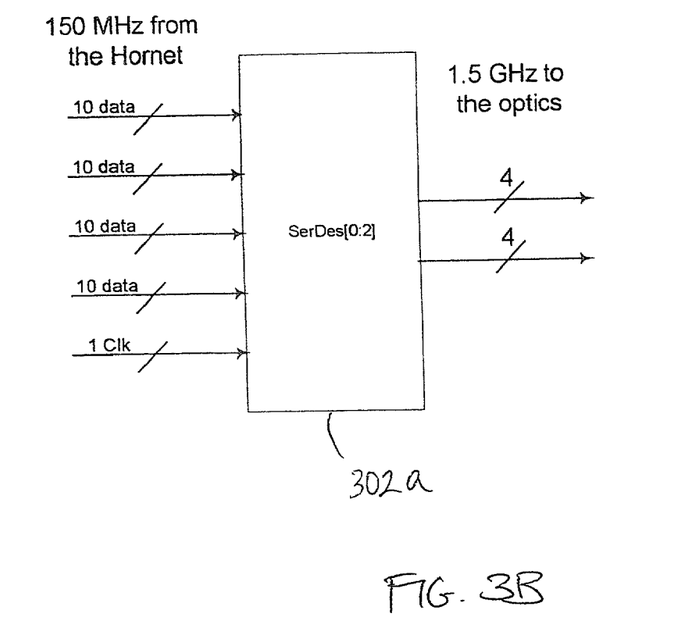
FIG. 3B is a block diagram showing further details of the interface between the serial-deserializer of FIG. 3A with other components in the system.

In FIG. 3B, shown is a more detailed view of the interface between the ASIC 304, the Ser/Des 302a–302c, the PAROLI Tx 212 and the PAROLI Rx 214 (discussed below). In an embodiment, the ASIC 304 is connected to the SerDes 302a–302c by links operating at 150 MHz, comprising 12 data slices at 10 bits each. The Ser/Des 302a–302c perform a 10:1 serialization of the data and have a total of 12 serial links to the PAROLI Tx 212, each running at 1.5 GHz. Similarly, there are a total of 12 serial links from the PAROLI Rx 214 back to the SerDes 302a–302c, each link running at 1.5 GHz.

Referring back to FIG. 3A, the serialized data received by Rx optical device 222 is deserialized by a plurality of Ser/Des 306a–306c in the SAC 220. The deserialized data then feeds into a plurality of dataslices 308 which are used to queue and store cells processed by the Ser/Des 306a–306c. The cells stored in the dataslices 308 may be transferred to the SMX 230 in the switching core 228 (FIG. 2).

As a non-limiting example, a suitable dataslice 308 is Part No. PM9313-HC manufactured by PMC Sierra. This product uses a proprietary LCS (LineCard to Switch) protocol. The SAC 220 may further include a port processor 310 that manages the LCS protocol across the HISLs 216, 218. While a proprietary protocol has been described by way of example, it will be appreciated that other protocols which are capable of operating across PAROLI links may be used.

In the return direction from the SAC 220 to the FIC, the data stream from the SMX 230 in the switching core 228 (FIG. 2) is returned through the dataslices 308 and into the Ser/Des 306a–306c in the SAC 220. The data stream is serialized in the Ser/Des 306a–306c and the serialized data stream is then fed to the Tx optical device 224 for transmission through HISL 218 back to the FIC 210.

In the FIC 210, Rx optical device 214 receives the data stream from the HISL 218 and feeds it to the Ser/Des 302a–302c in the FIC 220. The Ser/Des then deserializes the data stream and feeds the data stream back to the ASIC 304. The ASIC 304 in turn may pass the data stream to an appropriate output port.

Figure 4:
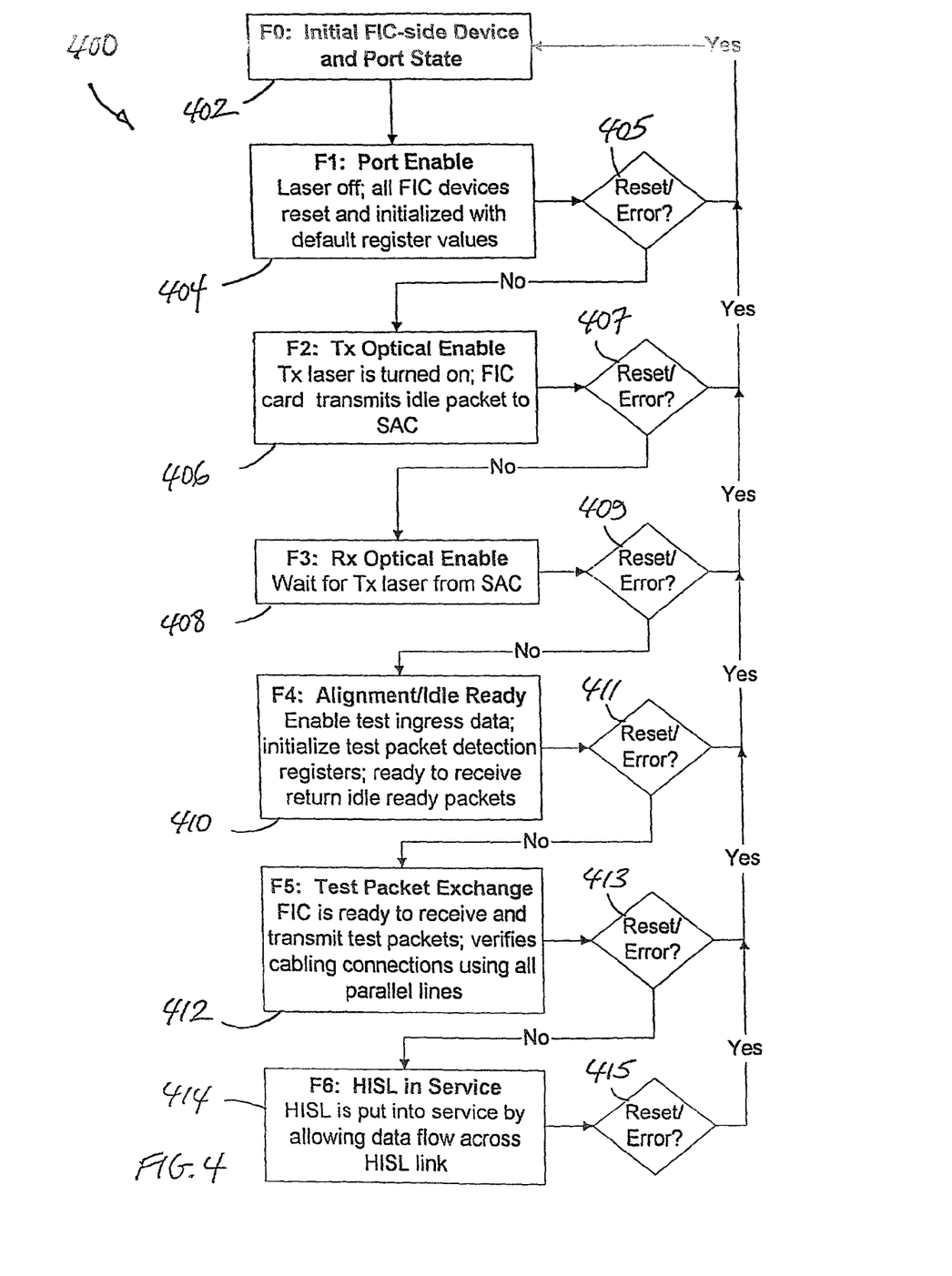
FIG. 4 is a flowchart of steps taken on the fabric interface card of FIG. 3, in accordance with an embodiment.

Now referring to FIG. 4, shown is a FIC-side process 400 carried out on the FIC 210 by the ASIC 304 during HISL 216, 218 synchronization with an SAC 220. The corresponding SAC-side process 500 is described further below with reference to FIG. 5.

F0: Initial FIC-Side Device and Port State

Step F0 shown at block 402 is the initial starting point of process 400. If at any point in the method the FIC or port was reset, or if an error was detected during normal operation, then block 402 is the restarting point of process 400, as explained below. From step F0, process 400 proceeds to step F1.

F1: Device Initialization and Port Enable

In step F1, shown at block 404, the Tx laser 212 is turned off (otherwise the SAC 220 may lock into incorrect timing) and all devices in the FIC 210 are reset and initilized with default register values. After all devices in the FIC 210 are reset, the HISLs 216, 218 are effectively shutdown with the Tx laser 212 turned off and the devices disabled. The initialization in step F1 removes the devices from reset, initializes encoding/decoding tables, and enables the ingress and egress physical layers. Initialization also "latches" the Ser/Des devices 302a–302c.

Latches are enabled through software writing to the SerDes 302a–302c device registers (not shown). When the device latch register is enabled, it locks the SerDes 302a–302c internal phase lock loop clock to the internal SerDes 302a–302c transmitter clock. This starts the Rx phase lock loop in the SerDes 302a–302c. Thereafter, the PAROLI Rx 214 is turned on and the SerDes 302a–302c will receive incoming idle packets, as described further below. The idle packets are detected by the SerDes 302a–302c in order to properly frame each incoming packet. If this latching step is omitted, then the SerDes 302a–302c will not be successful in locking onto incoming packets. SerDes latching is performed in this step F1, and in step S1, described further below, where Ser/Des 306a–306c are similarly latched.

Upon execution of step F1, or in the event of an error or reset instruction during execution of step F1, process 400 proceeds to decision block 405. If there is an error or a reset instruction, process 400 returns to step F0 and the link synchronization process is restarted. Otherwise, process 400 proceeds to step F2. Process 400 is designed to return to step F0 on the event of an error or reset at any point or step in the process. Therefore process 400 may be said to have an automatic restart.

F2: Tx (Transmit) Optical Enable

In step F2 shown at block 406, the Tx optical laser 212 is turned on. Once the Tx optical laser 212 is on, the FIC 210 begins to transmit idle packets to the SAC 220. It will be appreciated that SAC 220 will be undergoing its own link synchronization process, as described in detail further below, and must have its Rx optical 222 enabled in order to receive the idle packets from the FIC 210. Upon execution of step F2, or in the event of an error or reset instruction during execution of step F2, process 400 proceeds to decision block 407. Block 407 will return process 400 to step F0 if there is an error or a reset instruction. Otherwise, process 400 will proceed to step F3.

F3: Rx (Receive) Optical Enable

In step F3, shown at block 408, the FIC 210 enables the Rx optical 214 and waits to receive a Tx laser signal from SAC 220. The Rx optical 214 is enabled only after the Tx laser signal has been detected. Waiting to enable the Rx optical 214 until this step helps to prevent any "dark current" problem which may arise from trying to read a signal that is not yet being sent, thus reducing the need for restarting the link synchronization process. Upon execution of step F3, or in the event of an error or reset instruction during execution of step F3, the process 400 proceeds to decision block 409. Block 409 will return the process 400 to step F0 if there is an error or a reset instruction. Otherwise, the process 400 will proceed to step F4.

F4: Alignment and Idle Packets

In step F4, shown at block 410 when a Rx signal is detected, the FIC 210 ASIC memory, tables and test packet detection registers are initialized. Also, the internal devices of the FIC 210 are placed into operational mode. At this point the devices are waiting for Rx idle packets from the SAC 220 on all twelve fiber segments. The ASIC will begin to align itself to all twelve data segments while receiving idle packets. More specifically, idle packets do not necessarily arrive at precisely the same time on all twelve data segments. The ASIC needs to ensure the data is arriving within a certain time period on all twelve segments for it to be properly aligned. At this point, assuming that the SAC 220 has progressed to a corresponding step, the FIC 210 should be receiving return idle packets from the SAC 220, and be fully aligned to the data stream coming from the SAC 220. Upon execution of step F4, or in the event of an error or reset instruction during execution of step F4, the process 400 will proceed to decision block 411. Block 411 will return process 400 to step F0 if there is an error or a reset instruction. Otherwise, process 400 will proceed to step F5.

F5: Test Packet Exchange for HISL Verification

In step F5, shown at block 412, the FIC 210 is now ready to transmit test packets to the SAC 220 and to receive return test packets from the SAC 220. Verification through exchange of test packets cannot be performed until step F5 since a proper datapath is established only upon execution of step F4.

In the present embodiment, test packets are cells with a special header that allows them to be detected by hardware upon crossing the HISL 216, 218. The test packets may be written into devices in the FIC 210 and SAC 220 and queued for transmission into the data stream to each other. Upon arrival, these test packets are dequeued and signal an interrupt to request service of the test packet queue. The test packets are then read out of the queues and analyzed by software operating on the FIC 210 or on the SAC 220, as the case may be. If the content in the test packet is properly encoded, then the HISL 216, 218 is declared to be synchronized. Otherwise, auto recovery will engage to try to re-synchronize the link (i.e. the process 400 will return to step F0).

Upon execution of step F5, or in the event of an error or a reset instruction during execution of step F5, the process 400 proceeds to decision block 413. Block 413 will return the process 400 to step F0 if there is an error or a reset instruction. Otherwise, process 400 will proceed to step F6.

Step F6: HISL is "In Service"

In step F6, shown at block 414, the data flow for the FIC 210 is enabled. Once the test packets exchanged in step F5 are determined to be valid, the HISLs 216, 218 are put into service by allowing data flow across. Upon execution of step F6, the FIC-side link synchronization process 400 is complete and data can flow between the FIC 210 and the SAC 220. If an error or a reset is detected at block 415 during normal operation and transmission of data flow between the FIC 210 and the SAC 220, then process 400 will return to step F0. The link synchronization process will then restart from block 402, as discussed above.

Figure 5:
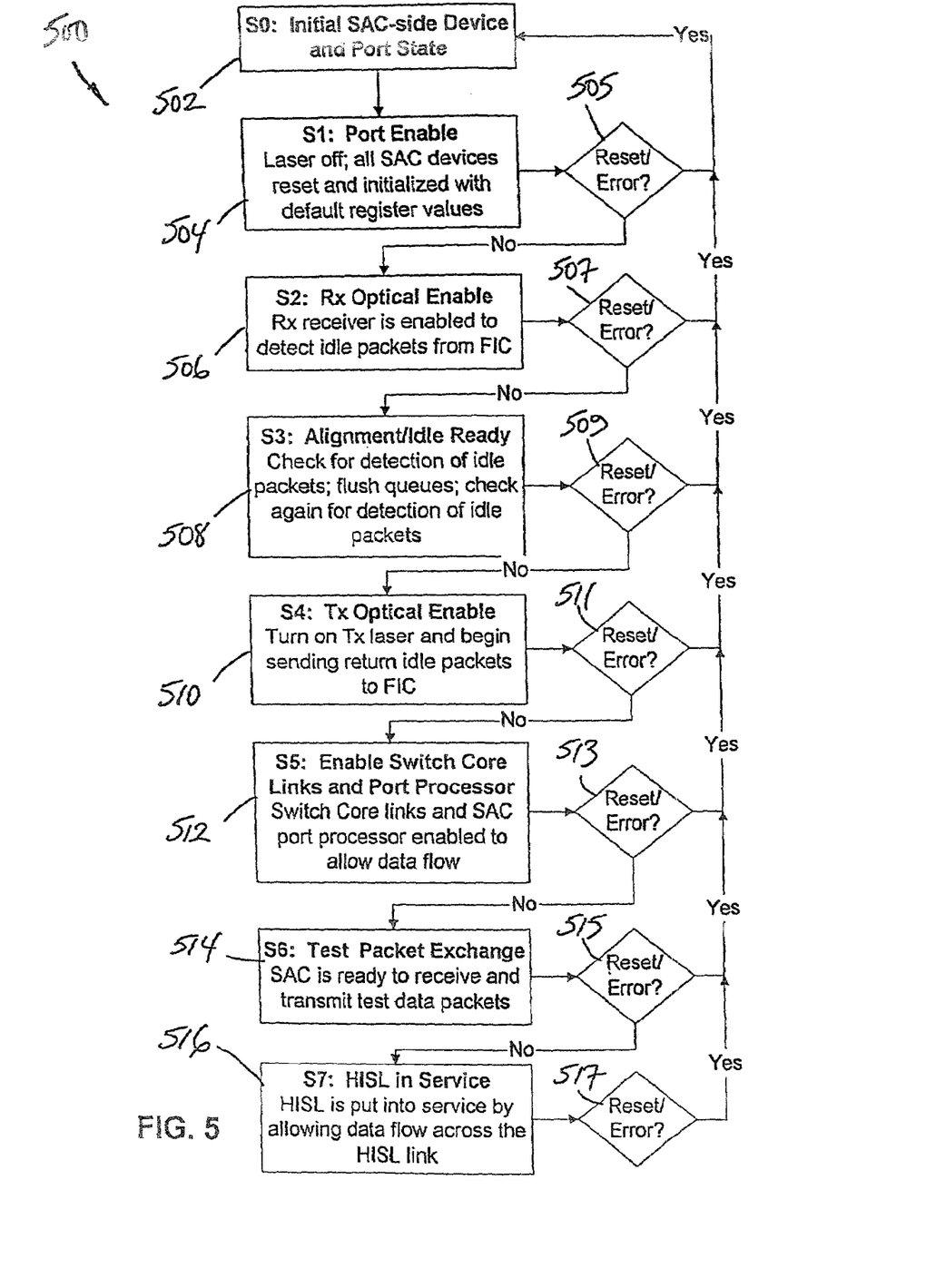
FIG. 5 is a flowchart of steps taken on a switch access card connected to the fabric interface card of FIG. 4 by a link, in accordance with an embodiment.

Now referring to FIG. 5, the SAC 220 executes a corresponding SAC-side link synchronization process 500. While idle packets and test packets are exchanged between the SAC-side process 500 and the FIC-side process 400, the processes are essentially independent and may operate by sensing the status of their respective devices.

S0: Initial Device and Port State

Step S0, shown at block 502, is that starting point of the link synchronization process on the SAC 220. If the SAC 220 is reset, or if an error is detected during normal operation, step S0 may also be the restarting point for link synchronization. Upon entering step S0, the process 500 proceeds to step S1, to begin the synchronization process.

S1: Device Initialization and Port Enable

In step S1, shown at block 504, devices in the SAC 220 are reset and initialized with default register values. The HISL 216, 218 between the SAC 220 and the FIC 210 is effectively shutdown as the laser devices in the SAC 220 are turned off and reset. The initialization in step S1, removes the SAC 220 devices from reset, initializes encoding/decoding tables, enables the SerDes 306a–306c, enables the dataslices 308, programs the 8B/10B tables in the dataslices 308, puts the port processor into non-operation mode and disables the optical Tx 224 and optical Rx 222. However, the optical Rx 222 is able to detect signals in the disabled mode. Initialization also "latches" the SerDes 306a–306c, analogously to the SerDes 302a–302c as discussed above for step F1.

Upon execution of step S1, or in the event of an error or a reset instruction during operation of step S1, process 500 proceeds to decision block 505. If there are any errors or reset instructions, block 505 returns process 500 to step S0, Otherwise, process 500 proceeds to step S2.

S2: Rx (Receive) Optics Enable

In step S2, shown at block 506, the Rx receiver in the SAC 220 is enabled and the Rx optical device is tested to determine whether it can detect a laser signal from the FIC 210. Upon execution of step S2, or in the event of an error or reset instruction during execution of step S2, process 500 proceeds to decision block 507. If there are any errors or reset instructions, process 500 returns to step S0. Otherwise, process 500 proceeds to step S3.

S3: Alignment and Idle Packets

In step S3, shown at block 508, data-slices 308 (FIG. 4) are checked to determine if they can detect the idle packets received from the FIC 210. If the idle packets can be detected, then the dataslices 308 are reset to flush any queues that may contain corrupted cells. Next the dataslices 308 are checked again to determine if they can detect idle packets. This is necessary when the dataslices 308 (e.g. PMC Sierra Part No. PM9313-HC) do not support a queue flush function. The only way to flush the queues on the dataslices 308 is to power them off and back on again (i.e. a device reset). The first dataslice test is to ensure that the dataslices 308 can see any idle packets at all. Then the dataslices 308 are reset to attempt to align all twelve dataslices 308 to flush the queues of any corrupted cells received beforehand. After a reset is completed, it is necessary to retest the queues to ensure that the incoming idle packets are properly aligned and not skewed across all twelve slices 308.

To prevent cells from being sent through the HISL 216, 218 before it is synchronized, internal switch core links and the port processor 310 are enabled only after link alignment. During HISL 216, 218 synchronization, it is undesirable to allow cells to flow into the switching core 228. Likewise, the port processor 310 on the SAC 220 can only be enabled when both HISL ports 216, 218 that are being synchronized are sending idle packets in both directions. This prevents the port processor 310 from communicating with the switch core scheduler 232 during HISL 216, 218 initialization.

Upon execution of step S3, or in the event of an error or reset instruction during execution of step S3, process 500 proceeds to decision block 509. At block 509, if there are any errors or reset instructions, the process 500 returns to step S0. Otherwise, the method proceeds to step S4.

S4: Tx Optical Enable

In step S4, shown at block 510, the Tx optical device in the SAC 220 is activated, and in response to detection of idle packets from the FIC 210 in step S3, return idle packets are sent to the FIC 210. Upon execution of step S4, or in the event of an error or reset instruction during execution of step S4, process 500 proceeds to decision block 511. At block 511, if there are any errors or reset instructions, process 500 will return to step S0. Otherwise, the method will proceed to step S5.

S5: Enable Switch Core Links and Port Processor

In step S5, shown at block 512, return idle packets are sent to the FIC 210 once the FIC 210 is properly "aligned" to the SAC 220 idle packets. (Alignment is achieved, for example, when twelve independent streams of bits find the start of a six byte sequence (idle packet) within the same clock cycle. If any one of the twelve streams fails to find idle packets or fails to achieve it in the same clock cycle, then the dataslices 308 are said to be skewed. This would require a restart at step S0.) The SAC 220 is adapted to detect this alignment and, upon its occurrence, the SAC 220 will enable the switching core links for data flow. The SAC 220 is also able to detect a change in idle packets coming from the FIC 210. There are two kinds of idle packets: The FIC 210 will initially send a first kind of idle packet that indicates that it is not receiving idle packets on its Rx device 214. And second kind of idle packet indicates that the FIC 210 is properly receiving idle packets on its Rx device 214. In this way the SAC 220 can determine if the FIC 210 is receiving idle packets that are transmitted from the SAC 220.

Thereafter, the idle packet counter is programmed to a lower insertion rate and an SAC port processor is enabled to allow the data flow. The port processor then will be able to communicate with a scheduler to allow cells queued in the dataslices 308 to enter the switching core. Upon completion of step S5, or in the event of an error or reset instruction during execution of step S5, process 500 proceeds to decision block 513. If there are any errors or reset instructions, process 500 will return to step S0. Otherwise, the method will proceed to step S6.

S6: Test Packet Exchange for HISL Verification

At step S6, shown at block 514, the SAC 218 is ready to receive and transmit test packets. These packets are written into the Port Processor 310 by software and queued into the data stream. The port processor 310 will indicate that it received a test packet which is read out of its queue and analyzed by software to ensure the packet is valid. Upon execution of step S6, or in the event of an error or reset instruction during execution of step S6, process 500 proceeds to decision block 515. If there are any errors or reset instructions, process 500 will return to step S0. Otherwise, the method will proceed to step S7.

S7: HISL is "In Service"

At step S7, shown at block 516, the HISL 216, 218 is put into service by allowing data flow across the HISL link. Upon execution of step S7, the link synchronization process is complete. During normal operation, if there are any errors or reset instructions, the process 500 will return to step S0. Upon such an occurrence, the FIC 210 and SAC 220 will begin to put all devices into reset and restart the link synchronization process at step S0, as explained above.

It is noted that those skilled in the art will appreciate that various modifications of detail may be made to the present embodiment, all of which would come within the scope of the invention. Specifically, any modification of the order of steps taken in process 400 or in process 500 which does not substantially affect the link synchronization process is contemplated to be within the scope of the present invention. For example, step F3 (Rx Optical Enable) may be executed concurrently with step F2 rather than consecutively. Similarly, the number of steps in each of process 400 and process 500 is not necessarily limiting, as one or more steps may be combined and viewed to be in the same step, or one of the steps described above may be parsed into a plurality of steps.

The invention claimed is:

1. A method of synchronizing unframed data flow through parallel optical links between first and second communications components, each said first and second communications components including an optical laser for transmitting laser signals to the other through said optical links, and each said first and second communications components including optical sensors for receiving said transmitted laser signals, the method comprising the steps of:
   (a) initializing each of said first and second communications components to default values and latching serial-deserializer circuits operatively connected to said optical links;
   (b) enabling said optical lasers and optical sensors and exchanging idle packets between said first and second communications components to establish a datapath across said optical links;
   (c) exchanging test data packets across said datapath established in step (b) to verify connection of all of said optical links; and
   (d) upon verification of connection of said optical links in step (c), enabling data flow between said first and second communications components; whereby, said optical links are synchronized, said datapath is established, and said test data transmission is verified before said data flow is allowed between said first and second communications components.

2. The method of claim 1, wherein step (a) includes
(i) flushing FIFO and input queues of said first and second communications components by performing a device reset.

3. The method of claim 1, wherein, step (b) comprises:
(iv) enabling said optical laser in said first communications device and transmitting laser signals comprising idle packets to said second communications device; (v) enabling said optical sensor in said first communications device; (viii) enabling said optical sensor in said second communications device; (ix) detecting idle packets in said second communications device; (viii) flashing any queues in said second communications device and detecting said idle packets received from said first communications device; (ix) upon detection of said idle packets from said first communications device in step (vii), enabling said optical laser in said second communications device and transmitting laser signals comprising return idle packets to said first communications device; and (x) detecting said return idle packets from said second communications device using said optical sensor in said first communications device.

4. The method of claim 3, wherein, step (c) comprises:
(xi) generating test data packets in said first communications device and transmitting said test data packets across said datapath to said second communications device; (xii) receiving and enqueuing said test data packets in said second communications device; (xiii) testing said dequeued test data packets to verify that they are properly encoded; (xiv) upon receiving properly encoded test data packets from said first communications device in step (xiii), generating return test data packets and transmitting said return test data packets across said datapath to said first communications device; and (xv) receiving and enqueuing said return test data packets generated in step (xiii) in said first communications device; (xvi) testing said dequeued return test data packets to verify that they are properly encoded; and (xvii) upon receiving properly encoded return test data packets, verifying the connection of said optical links.

5. The method of claim 1, wherein, step (b) comprises: (i) enabling said optical laser in said first communications device and transmitting laser signals comprising idle packets to said second communications device; (ii) enabling said optical sensor in said first communications device; (iii) enabling said optical sensor in said second communications device; (iv) flushing any queues in said second communications device and detecting said idle packets received from said first communications device; (v) upon detection of said idle packets from said first communications device in step (vii), enabling said optical laser in said second communications device and transmitting laser signals comprising return idle packets to said first communications device; and (vi) detecting said return idle packets from said second communications device using said optical sensor in said first communications device.

6. The method of claim 3, wherein, step (c) comprises:
(vii) generating test data packets in said first communications device and transmitting said test data packets across said datapath to said second communications device; (viii) receiving and enqueuing said test data packets in said second communications device; (ix) testing said dequeued test data packets to verify tat they are properly encoded; (x) upon receiving properly encoded test data packets from said first communications device in step (ix), generating return test data packets and transmitting said return test data packets across said datapath to said first communications device; and (xi) receiving and enqueuing said return test data packets generated in step (xiii) in said first communications device; (xii) testing said dequeued return test data packets to verify that they are properly encoded; and (xiii) upon receiving properly encoded return test data packets, verifying the connection of said optical links.

7. The method of claim 1, wherein, step (c) comprises: (i) generating test data packets in said first communications device and transmitting said test data packets across said datapath to said second communications device; (ii) receiving and enqueuing said test data packets in said second communications device; (iii) testing said dequeued test data packets to verify that they are properly encoded; (iv) upon receiving properly encoded test data packets from said first communications device in step (iii), generating return test data packets and transmitting said return test data packets across said datapath to said first communications device; and (iv) receiving and enqueuing said return test data packets generated in step (xiii) in said first communications device; (v) testing said dequeued return test data packets to verify that they are properly encoded; and (vi) upon receiving properly encoded return test data packets, verifying the connection of said optical links.

8. A method of resynchronizing unframed data flow through parallel optical links between first and second communications components upon an occurrence of a communications error therebetween, each said first and second communications components including an optical laser for transmitting laser signals to the other through said optical links, and each said first and second communications components including optical sensors for receiving said transmitted laser signals, the method comprising the steps of: (a) detecting a communications error; (b) upon detection of said communications error in step (a) initializing each of said first and second communications components; (c) enabling said optical lasers and optical sensors and exchanging idle packets between said first and second communications components to establish a datapath across said optical links; d) exchanging test data packets across said datapath established in step (a) to verify connection of all of said optical links; and (e) upon verification of connection of said optical links in step d), enabling data flow between said first and second communications components; whereby, said optical links are synchronized, said datapath is established, and said test data transmission is verified before said data flow is allowed between said first and second communications components.

9. The method of claim 8, wherein, step (b) comprises: (i) flushing FIFO performed by a device reset and input queues of said first and second communications components; (ii) enabling said optical lasers and said optical sensors; and (iii) latching serial-deserializer circuits operatively connected to said optical links.

10. The method of claim 9, wherein, step (c) comprises: (iv) enabling said optical laser in said first communications device and transmitting laser signals comprising idle packets to said second communications device; (v) enabling said optical sensor in said first communications device; (vi) enabling said optical sensor in said second communications device; (vii) flushing any queues in said second communications device and detecting said idle packets received from said first communications device; (viii) upon detection of said idle packets from said first communications device in step (vii), enabling said optical laser in said second communications device and transmitting laser signals comprising return idle packets to said first communications device; and (ix) detecting said return idle packets from said second communications device using said optical sensor in said first communications device.

11. The method of claim 10, wherein, step (d) comprises: (x) generating test data packets in said first communications device and transmitting said test data packets across said datapath to said second communications device; (xi) receiving and enqueuing said test data packets in said second communications device; (xii) testing said dequeued test data packets to verify that they are properly encoded; (xiii) upon receiving properly encoded test data packets from said first communications device in step (xii), generating return test data packets and transmitting said return test data packets across said datapath to said first communications device; and (xiv) receiving and enqueuing said return test data packets generated in step (xiii) in said first communications device; (xv) testing said dequeued return test data packets to verify that they are properly encoded; and (xvi) upon receiving properly encoded return test data packets, verifying the connection of said optical links.

12. A method of synchronizing data flow through parallel optical links between a fabric interface card and a switch access card, each said fabric interface card and said switch access card including an optical laser for transmitting laser signals to the other through said optical links, and each said fabric interface card and said switch access card including optical sensors for receiving said transmitted laser signals, the method comprising the steps of:
  (a) initializing each of said fabric interface card and said switch access card to default values and latching serial-deserializer circuits operatively connected to said optical links;
  (b) enabling said optical lasers and optical sensors and exchanging idle packets between said fabric interface card and said switch access card to establish a datapath across said optical links;
  (c) exchanging test data packets across said datapath established in step (b) to verify connection of all of said optical links; and (d) upon verification of connection of said optical links in step (c), enabling data flow between said fabric interface card and said switch access card; whereby, said optical links are synchronized, a datapath is established, and test data transmission is verified before data flow is allowed between said fabric interface card and said switch access card.

13. The method of claim 12, wherein, step (a) includes:
  (i) flushing FIFO and input queues by performing a device reset.

14. The method of claim 12, wherein, step (b) comprises:
  (iv) enabling said optical laser in said fabric interface card and transmitting laser signals comprising idle packets to said switch access card; (v) enabling said optical sensor in said fabric interface card; (vi) enabling said optical sensor in said switch access card; (vii) flushing any queues in said switch access card and detecting said idle packets received from said fabric interface card; (viii) upon detection of said idle packets from said fabric interface card in step (vii), enabling said optical laser in said switch access card and transmitting laser signals comprising return idle packets to said fabric interface card; and (ix) detecting said return idle packets from said switch access card using said optical sensor in said fabric interface card.

15. The method of claim 14, wherein, step (c) comprises:
  (x) generating test data packets in said fabric interface card and transmitting said test data packets across said datapath to said switch access card; (xi) receiving and enqueuing said test data packets in said switch access card; (xii) testing said dequeued test data packets to verify that they are properly encoded; (xiii) upon receiving properly encoded test data packets from said fabric interface card in step (xii), generating return test data packets and transmitting said return test data packets across said datapath to said fabric interface card; and (xiv) receiving and enqueuing said return test data packets generated in step (xiii) in said fabric interface card; (xv) testing said dequeued return test data packets to verify that they are properly encoded; and (xvi) upon receiving properly encoded return test data packets, verifying the connection of said optical links.

16. A method of resynchronizing data flow through parallel optical links between a fabric interface card and a switch access card upon an occurrence of a communications error therebetween, each said fabric interface card and said switch access card including an optical laser for transmitting laser signals to the other through said optical links, and each said fabric interface card and said switch access card including optical sensors for receiving said transmitted laser signals, the method comprising the steps of: (a) detecting a communications error, (b) upon detection of a communications error in step (a) initializing each of said fabric interface card and said switch access card; (c) enabling said optical lasers and optical sensors and exchanging idle packets between said fabric interface card and said switch access card to establish a datapath across said optical links; (d) exchanging test data packets across said datapath established in step (c) to verify connection of all of said optical links; and (e) upon verification of connection of said optical links in step (d), enabling data flow between said fabric interface card and said switch access card; whereby, said optical links are synchronized, said datapath is established, and said test data transmission is verified before said data flow is allowed between said fabric interface card and said switch access card.

17. A method of synchronizing unframed data flow through a communications link between first and second communications components, each said first and second communications components including a transmitter for transmitting signals to the other through said communications link, and each said first and second communications includes a receiver for receiving said transmitted signals, the method comprising the steps of:
(a) initializing each of said first and second communications components to default values and latching serial-deserializer circuits operatively connected to said optical links;
(b) enabling said transmitters and said receivers and exchanging idle packets between said first and second communications components to establish a connection across said communications link;
(c) exchanging test data packets across said datapath established in step (b) to verify connection of said communications links; and
(d) upon verification of connection of said communications link in step (c), enabling data flow between said first and second communications components.

18. The method in step 17, wherein, said communications link is a parallel optical link, said transmitter is an optical laser, and said receiver is an optical sensor.

19. The method in step 18, further comprising the step of completing synchronization of said optical links, establishing said datapath, and verifying said test data transmission before data flow is allowed between said first and second communications components.

20. A method of synchronizing a parallel optical link between a linecard circuit and a switch fabric for permitting flow of data from said linecard to said switch fabric, comprising;
a) resetting devices in said linecard to default register values;
b) latching serial-deserializer circuits in said linecard operatively connected to data segments of said parallel optical link;
c) receiving idle packets over said data segments from said switch fabric;
d) using said idle packets to align said data segments; and
e) after aligning said data segments with said idle packets received from said switch fabric, enabling flow of data over said parallel optical link from said linecard to said switch fabric.

21. A method of synchronizing a parallel optical link between a linecard circuit and a switch fabric for permitting flow of data from said switch fabric to said linecard, comprising:
a) resetting devices in said switch fabric to default register values;
b) latching serial-deserializer circuits in said switch fabric operatively connected to data segments of said parallel optical link;
c) detecting idle packets received over said data segments from said line card;
d) performing a device reset to flush any queues that may contain corrupted cells;
e) using said idle packets to align said data segments; and
f) after aligning said data segments with said idle packets received from said linecard, enabling flow of data over said parallel optical link from said switch fabric to said linecard.

* * * * *